Jan. 27, 1942.  E. J. SERPAS  2,271,403
ROTARY LIQUID FUEL INJECTING INTERNAL COMBUSTION ENGINE
Filed Aug. 27, 1937  8 Sheets-Sheet 1

E. J. Serpas
INVENTOR.

E. J. Serpas
INVENTOR.

Jan. 27, 1942.  E. J. SERPAS  2,271,403
ROTARY LIQUID FUEL INJECTING INTERNAL COMBUSTION ENGINE
Filed Aug. 27, 1937  8 Sheets-Sheet 6
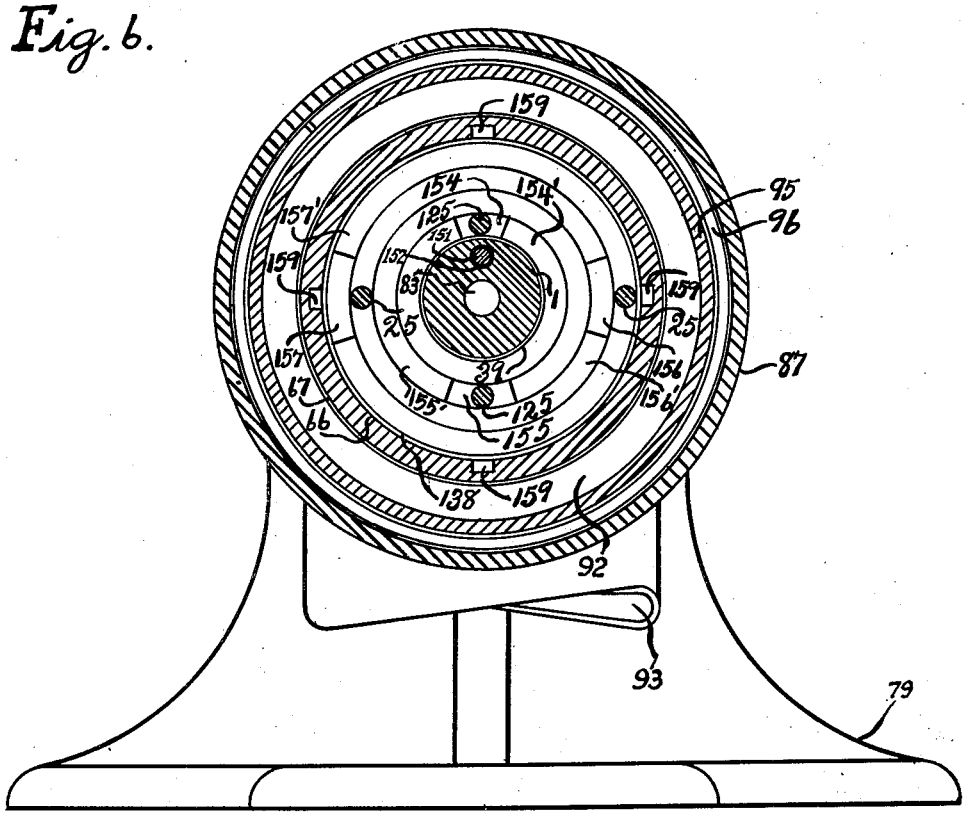
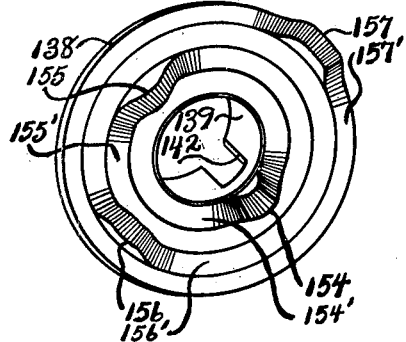
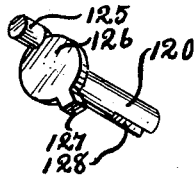
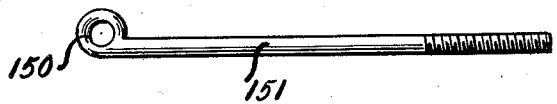

Jan. 27, 1942. E. J. SERPAS 2,271,403
ROTARY LIQUID FUEL INJECTING INTERNAL COMBUSTION ENGINE
Filed Aug. 27, 1937 8 Sheets-Sheet 7
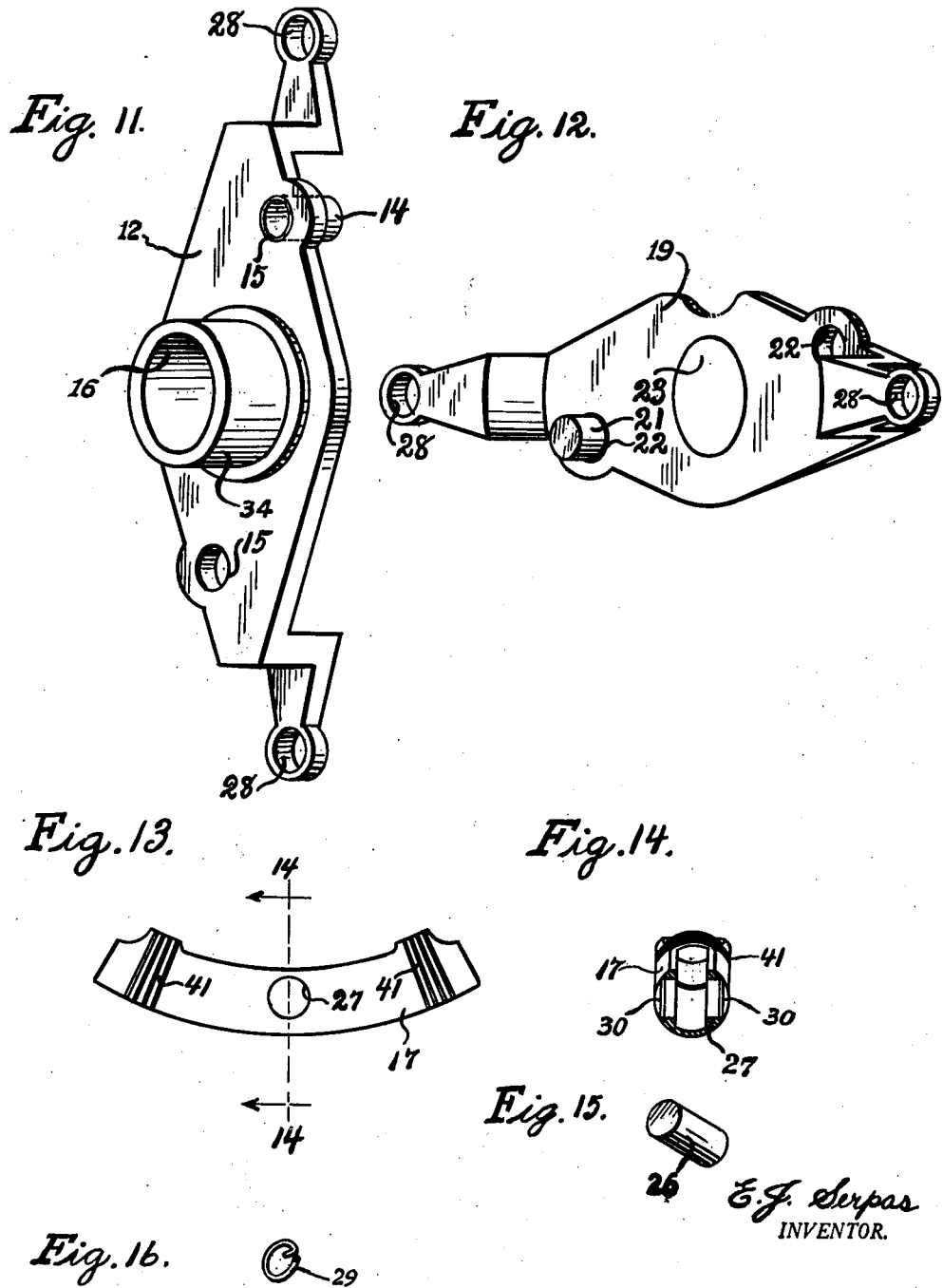
E. J. Serpas
INVENTOR.

E. J. Serpas
INVENTOR.

Patented Jan. 27, 1942

2,271,403

UNITED STATES PATENT OFFICE 2,271,403

ROTARY LIQUID FUEL INJECTING INTERNAL COMBUSTION ENGINE

Ernest J. Serpas, New Orleans, La., assignor of two-fifths to J. S. Waterman, New Orleans, La.

Application August 27, 1937, Serial No. 161,199

3 Claims. (Cl. 123—43)

My invention relates to improvements in rotary liquid fuel injecting internal combustion engine particularly the two cycle type, wherein an annular piston chamber, divided into equally spaced segments, is rotatably mounted on a stationary crank shaft and provided to carry opposed pistons therein each of said segments in an annular course.

An important object of the invention is that it relates to and is a modification of my pending applications Serial No. 111,091 filed November 16, 1936, and Serial No. 151,568 filed July 2, 1937.

Further objects of this invention are first, to provide a simple combination of connecting rod and toggle joint links operatively engaged to a radial cross head guide means carried by the casing in order to connect the pistons to the crank shaft and to the annular casing whereby to produce the torque and the necessary piston action in order that the admission of air to and the release of the exhaust gases from the firing chamber occur simultaneously and in pairs and made to fire likewise; second to provide compression ratio of such magnitude wherein the charges of air compressed in the firing chambers reach a rational temperature sufficiently high to ignite the fuel oil when injected therein; third, novel means for distributing and injecting measured quantity of liquid fuel into the firing chambers, in pairs, simultaneously and at a time when the firing chambers are subjected to the highest magnitude of compression in order that the fuel is ignited by the temperature of the air; fourth, simplified means for varying the measured quantities of fuel oil to be injected in the firing chambers in order to control the speed of the engine; fifth, simplified means of lubricating the engine parts; sixth, the accessibility of all of the engine parts.

Figure 1:
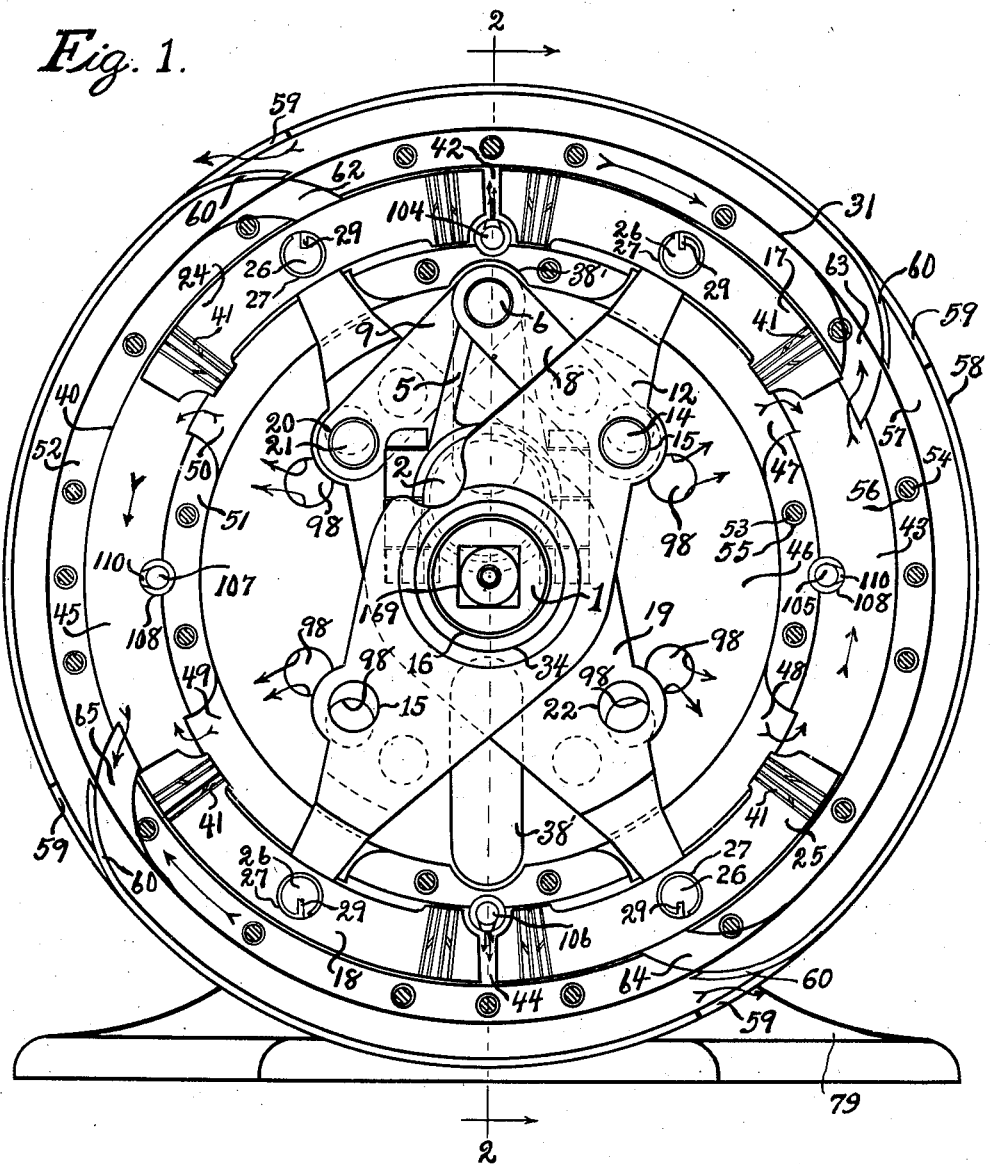
Figure 2:
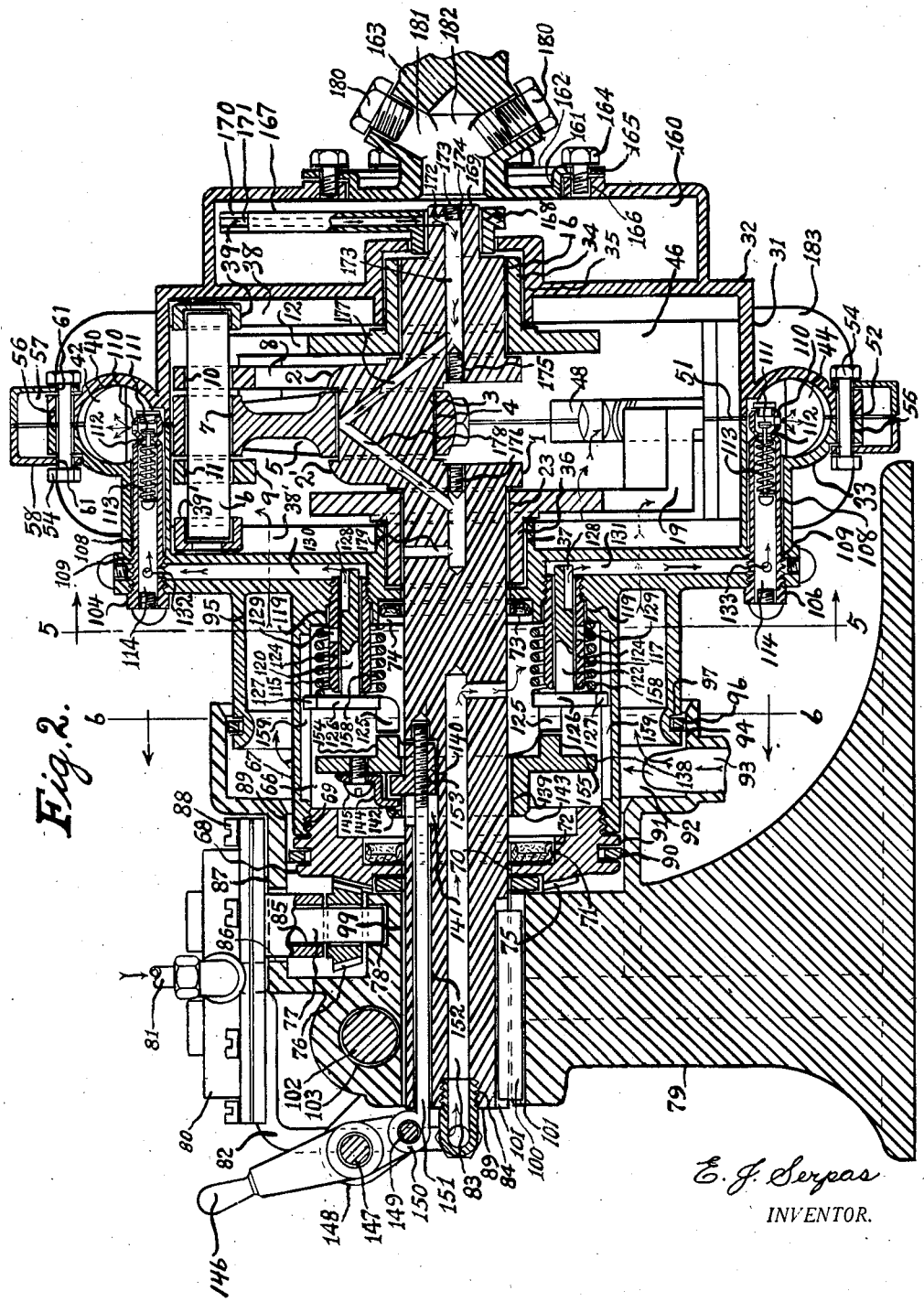
Figure 3:
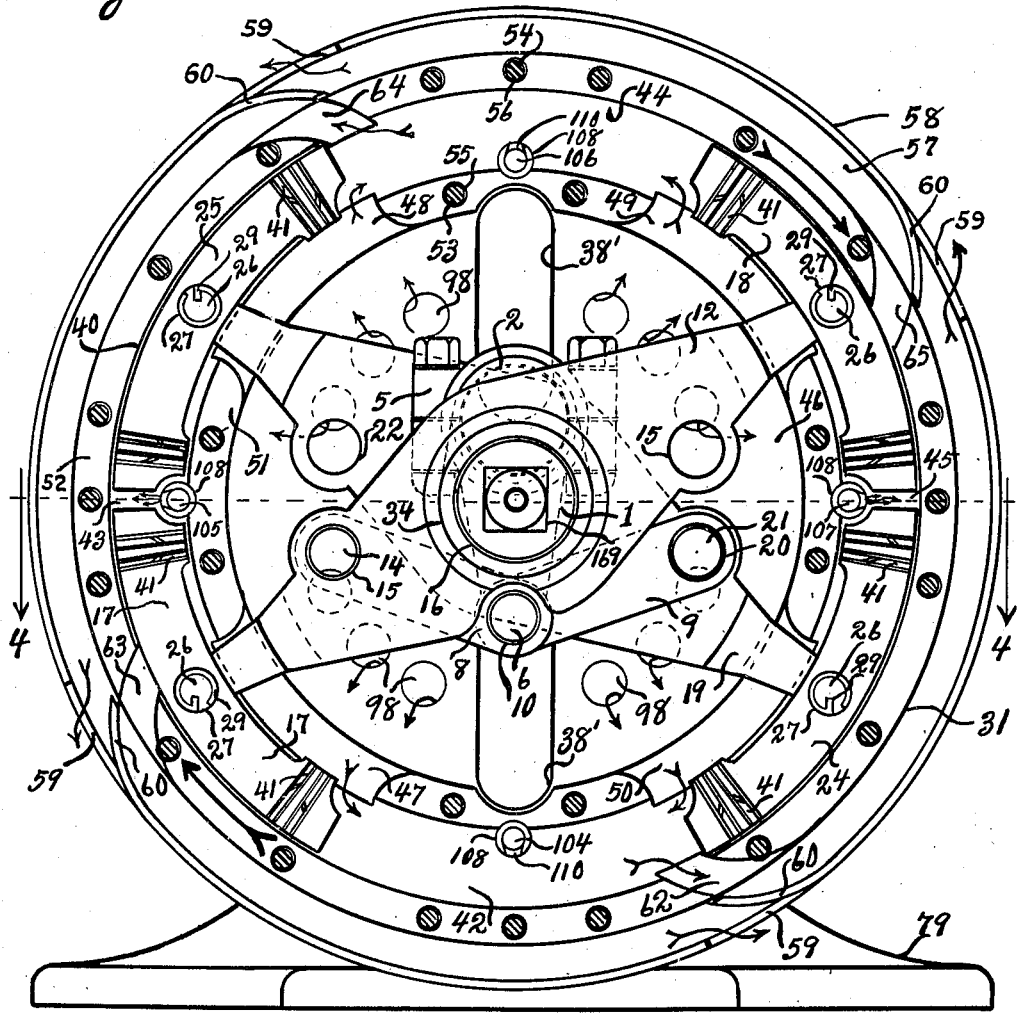
Figure 4:
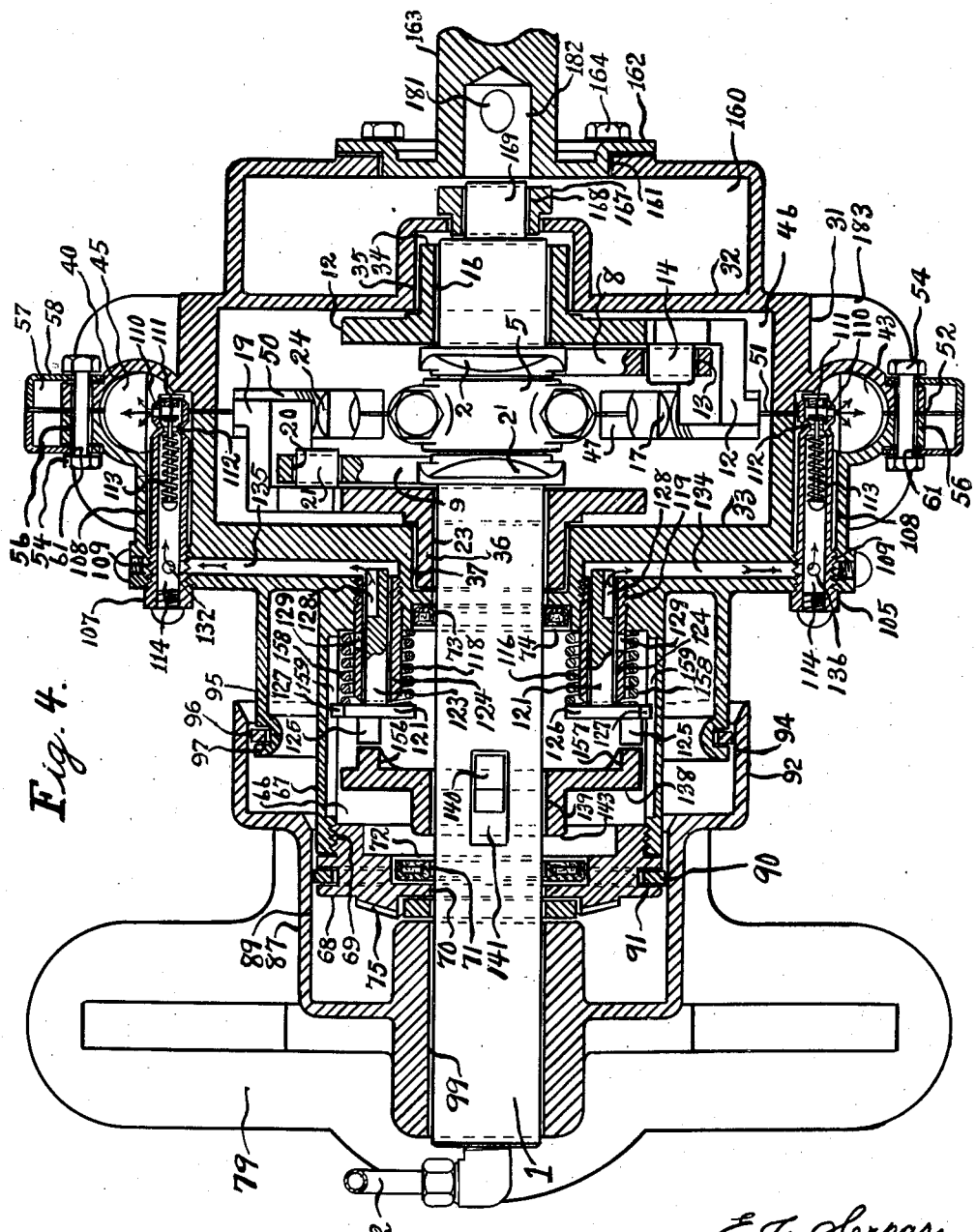
Figure 5:
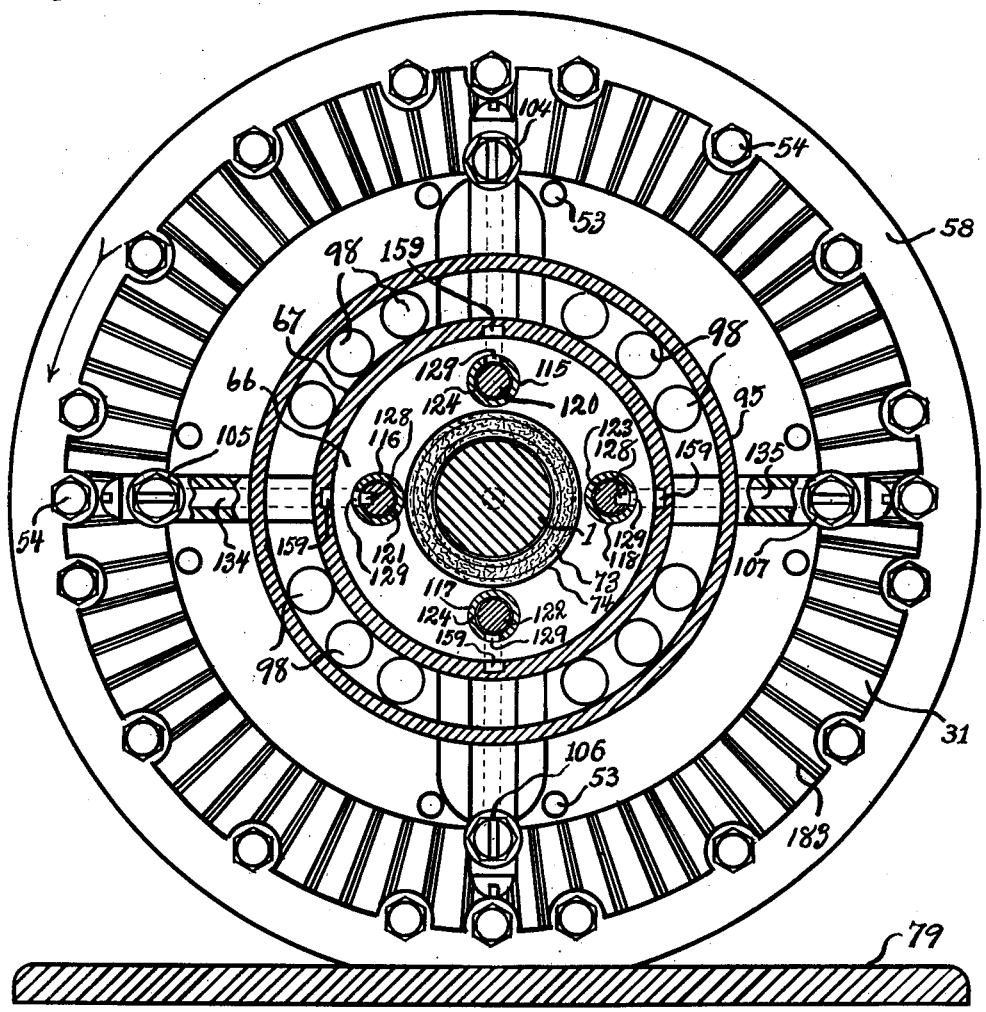
Figure 18:
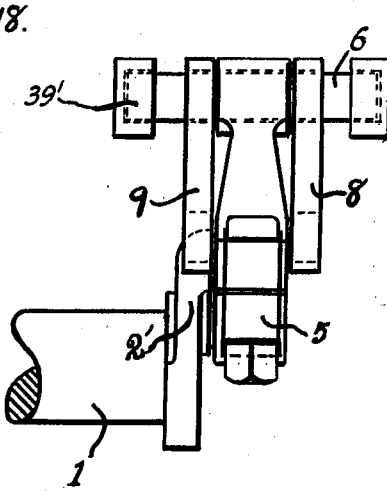
Figure 17:
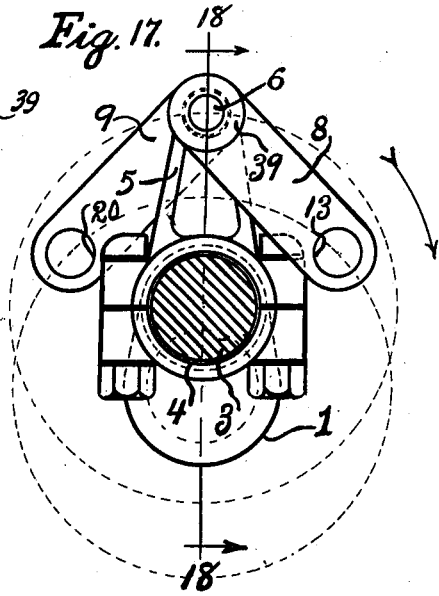
Figure 20:
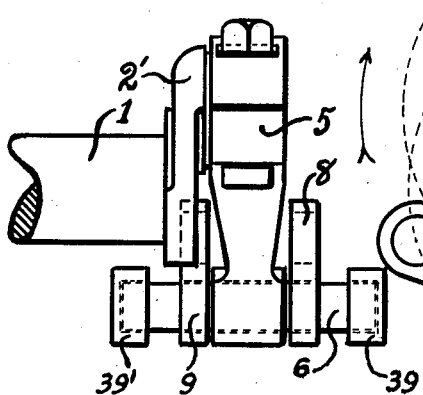
Figure 19:
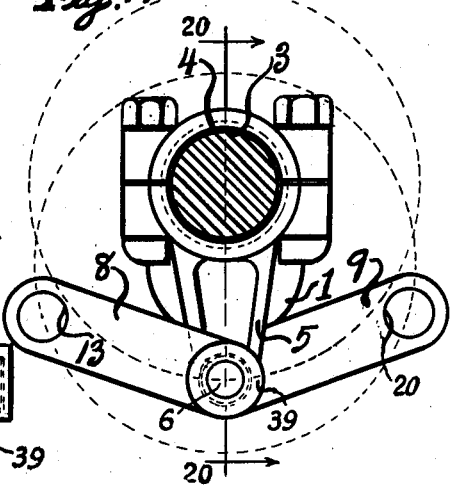

I attain these objects and other features by mechanism illustrated in the accompanying drawings in which, Figure 1 is a vertical sectional view showing the engine as it appears after removing one of the castings; Figure 2, is a longitudinal sectional view taken on line 2—2 of Figure 1, showing in general the entire structure of the engine; Figure 3, is a vertical sectional view of the engine as it appears after revolving the casing in the direction indicated by the arrow, one half turn from the position as that shown in Figure 1; Figure 4 is a longitudinal sectional view taken on line 4—4 of Figure 3, showing the engagement of the fuel injecting pumps to the stationary cam disc, as they inject the fuel into the firing chambers when the engine reaches the position as that shown in Figure 3; Figure 5, is a vertical sectional view taken on line 5—5 of Figure 2 in order to show the circular position of the fuel injecting pumps; Figure 6, is a sectional view taken on line 6—6 of Figure 2 in order to show a face view of the stationary cam disc and the engagement of the cam lobes to the fuel injecting pumps corresponding to a position as that shown in Figure 1; Figure 7, is a detailed perspective view of the stationary cam disc; Figure 8, is a detailed perspective view of the sliding key for locking the stationary cam disc to the crank shaft against rotary action and for facilitating the shifting of the same laterally back and forth on the shaft; Figure 9, is a detailed perspective of one of the fuel injector plungers; Figure 10, is a detailed elevation of the stationary cam disc shifting rod; Figures 11 and 12, are detailed perspectives of the piston carrying arms; Figure 13, is a detailed elevation of one of the pistons; Figure 14, is a sectional view of the piston taken on line 14—14 of Figure 13; Figure 15 is a detailed perspective of one of the wrist pins; Figure 16, is a detailed perspective of one of the wrist pin locks; Figures 17, 18, 19 and 20 are a series of views showing the structure of the connecting rod and toggle joint links in two positions as they are revolved about the crank pin; Figure 17 is an elevation showing the parts corresponding to a position as that as shown in Figure 1; Figure 18 is an elevation taken on line 18—18 of Figure 17 viewing the parts in the direction of the arrow; Figure 19 is an elevation showing the parts in a corresponding position to that as shown in Figure 3; Figure 20 is an elevation taken on line 20—20 of Figure 19 showing the parts as they appear when looking in the direction of the arrow.

Similar numbers refer to similar parts through the several views.

No. 1 indicates in general a stationary crank shaft provided with webbed portions 2 and 2', as shown in Figure 2, a crank pin 3 engaged in bearing 4 of connecting rod 5 rotatably mounted and extends radially there from the crank pin 3, the rod 5 receives the wrist pin 6 tightly pressed in its bearing 7.

The wrist pin 6 receives and carries the toggle joint links 8 and 9 which are rotatably mounted thereon at their bearing ends 10 and 11 respectively and disposed thereon at opposite sides of the connecting rod 5.

The free end of the toggle joint link 8 extends from the wrist pin 6 in the direction of rotation, see Figure 1, and is connected to the piston carrying arm 12 by its bearing 13 as shown in Figure 4, engaging the pin 14 tightly pressed in the opening 15 in the piston carrying arm 12 which is rotatably mounted on the crank shaft 1 and disposed thereon at the side of the webbed portion 2 on its bearing 16 and extends diametrically from the shaft and carries the pistons 17 and 18, as shown in Figures 1 and 3; while the free end of the toggle joint link 9 extends in the opposite direction to that of rotation and is connected to the piston carrying arm 19 through its bearing 20, shown in Figure 4; engaging pin 21 tightly pressed in the opening 22 formed in the piston carrying arm 19, as shown in Figures 11 and 12, rotatably mounted on the crank shaft engaged in its bearing 23 and disposed thereon at one side of the webbed portion 2', as shown in Figures 2 and 4 extends diametrically therefrom and carries the pistons 24 and 25, shown in Figures 1 and 3.

The pistons 17 and 18, 24 and 25, are carried diametrically opposite each other on the piston carrying arms 12 and 19 respectively and are coupled thereto the arms by the piston pins 26 engaging the piston pin bearings 27 formed in each of the pistons and the eye 28 formed in the ends of the arms. The piston pin locks 29 engaged at both ends of each of the piston pins 26 in the keeper grooves 30 formed in each of the piston pin bearings 27 are for locking the piston pins 26 in the pistons, as shown in detail in Figures 11, 12, 13, 14, 15 and 16.

The casing 31 constituting the castings 32 and 33 is rotatably mounted on the hub projection portion 34, see Figures 2 and 4, of the piston carrying arm 12 engaged in the casing bearing 35 and on the hub projection 36 of the piston carrying arm 19 engaged in the casing bearing 37 and is provided with the radial crosshead guide grooves 38 and 38', shown in Figures 1, 2, and 3, receiving the rollers 39 and 39' engaged at the ends of the wrist pin 6 in order that when a rotary impulse is given to the casing 31 it is imparted to the piston carrying arms 12 and 19 and consequently to the pistons 17 and 18, 24 and 25 and the connecting rod in order that they are carried by the casing and that the speed of the piston carrying arms 12 and 19, and consequently the pistons carried thereby are accelerated positively and negatively relative to the speed of the casing, in a certain definite half turn of the circle and to cause an alternation of magnitude of said positive and negative acceleration of the speed of the piston carrying arms and consequently the piston carried thereby in the second half turn of the circle in each revolution of the engine, in order to cause the pumping action of the pistons, for compressing the air and for transmitting the energy to rotate the casing.

A cylindrical annular piston chamber 40 is formed in the casing 31 between the castings 32 and 33 and it receives the pistons 17 and 18, 24 and 25, which are provided with piston rings 41 and in order to seal the spaces 42, 43, 44 and 45 between the pistons which constitutes the firing chambers.

The crank case chamber 46 also formed in the casing 31 between the castings 32 and 33 and surrounded by the piston chamber 40 serves to receive and subject the intake air to centrifugal action in order to force the air into the firing chambers 42, 43, 44 and 45 through the intake ports 47, 48, 49 and 50 adjoining the piston chamber 40 and the crank case 46 and are controlled by a relative motion of the pistons to that of the castings in such order as to register communication of the firing chambers to the crank case chamber 46 in proper sequency.

The intake ports 47, 48, 49 and 50 are further provided to receive and permit the passing of the piston carrying arms 12 and 19 which extend diametrically across the crank case and into the piston chamber 40 and are of sufficient length to permit a relative motion of the arms in respect to the castings 32 and 33.

The castings 32 and 33 are secured together at two annular points of contact 51 and 52 by two circular row of bolts 53 and 54 engaged in the bolt openings 55 and 56 respectively.

Muffler vacuum chamber 57 is formed at the periphery of the casing 31 by the muffler shell 58 provided with outlet openings 59 formed at the outermost periphery of the muffler shell 58 and are each provided, at their ends in the opposite direction to that of rotation, with an impeller 60 projecting from the outer wall of the muffler shell 58 in towards and with a curve in the direction of rotation and reaching in across the muffler chamber 57 and contacting the outer periphery of the castings 32 and 33 in order to evacuate the muffler chamber 57. The muffler shell 58 is secured to the castings 32 and 33 by the circular row of bolts 54 engaging the circular row of bolt openings 61 in the muffler.

The exhaust ports 62, 63, 64 and 65 are formed between and in the outer walls of the castings 32 and 33 and they adjoin the muffler vacuum chamber 57 and the piston chamber 40 for releasing the exhaust gasses from the firing chambers 42, 43, 44 and 45 respectively and are controlled by relative motion of the pistons in respect to that of the castings 32 and 33 in such order that registration of the firing chambers to the muffler vacuum chamber occur in proper sequency and in synchrony with registration of the intake ports 47, 48, 49 and 50 in order that the release of the exhaust gases from and admission of air into the firing chambers occur simultaneously, and to the firing chambers in pairs and to those diametrically opposite each other.

The fuel oil chamber 66 in the tubular shaped casing 67, an integral part of and carried by the casting 33, extends from the discal side of the casting longitudinally of and concentric to the crank shaft 1, see Figures 2, 4 and 5, and receive the head cap 68 threaded at 69 in the end of the casing 67 bored at 70 to receive the crank shaft 1. The U shaped packing 71 in recess 72 in the head cap 68 and U shaped packing 73 in the recess 74 formed in the discal wall of the casting 33 serves to seal the fuel oil chambers 66 at these two points of rotation.

The bevel gear 75 formed in and carried by the head cap 68 engaging the pinion gear 76 carried on the shaft 77 engaged in the bearing 78 formed in the engine support 79 serves to operate the fuel pump 80; having inlet pipe 81, outlet pipe 82 connected to the conduit 83 at 84 formed in the crank shaft 1 leading to and communicating with the fuel oil chamber 66 in order to supply fuel oil therein the chamber under pressure. The fuel pump 80 is provided with the extending bearing 85 receiving shaft 77 extending downwardly therefrom the pump through the opening 86 formed in the upper part of the gear casing 87 at which point the pump is secured thereto the gear casing by the screws 88.

Gear casing 87 is of a circular formation an integral part of the engine support 79 extending therefrom, parallel to and concentric to the crank shaft 1 bored at 89 to receive the head cap 68 and the end of the tubular casing 67 provided with sealing ring 90 engaged in groove 91 for sealing the gear chamber 87 at this point in order that lubricant is held therein the gear chamber for lubricating the gears.

The gear casing 87 extends from the engine support 79 towards the casting 33 and flares out into an increased diameter forming the intake air casing 92 provided with an air entrance 93 and bored at 94 to freely receive the tubular shaped intake manifold 95 which is formed by and is an integral part of the casting 33, and provided with sealing ring 96 in the groove 97 contacting at bore 94 which permits a rotary seal tight connection at this point for conducting the air from the air casing 92 to the crank case 46 through the intake manifold 95 and the openings 98 formed in the discal wall of casting 33 adjoining the crank case to the intake manifold 95, as shown in Figures 1, 3 and 5.

The crank shaft 1 engages the anchor bearing 99 formed in the engine support 79 and is provided with key 100 engaging key seat 101 in the shaft and key seat 101' in the anchor bearing for locking the shaft in a fixed position. Bolt 102 engaging the bolt opening 103 just above the anchor bearing 99 facilitate means for clamping the shaft in the bearing whereby a lateral adjustment of or removal of the shaft therefrom is easily controlled.

The firing chambers 42, 43, 44 and 45 are each provided with fuel oil nozzles 104, 105, 106 and 107 respectively for distributing the fuel oil into the chambers and are engaged in the nozzle ports 108 as shown in Figures 1 and 3 and are threaded therein the ports at 109 as shown in Figures 2 and 4 and enter from one side of the casting 33 into and at the innermost part of the firing chambers and have their discharging jets 110 pointing in a direction away from the axes of the engine in order that the centrifugal force acts to throw the oil from the jets in and through the compressed air in the firing chambers. Each of the fuel oil nozzles 104, 105, 106 and 107 are provided with check valve 111, urged to the seat 112, by the spring 113 in their barrel 114 which permits the valve to open under a predetermined pressure to facilitate the passing of measured quantities of fuel oil out of the fuel oil nozzles and through the jets 110 and into the firing chambers.

In order to distribute the fuel oil from the oil chamber 66 to the fuel oil nozzles 104, 105, 106 and 107 the fuel injecting pumps 115, 116, 117 and 118 are provided in the chamber 66 in a circular row and segregated diametrically opposite each other to be actuated so, in pairs and simultaneously and they lie on diametrical lines at right angles to each other, surrounding the crank shaft 1 as shown in Figure 5, and are threaded in the opening 119 in the discal wall of and carried by the casting 33 to revolve around the crank shaft 1 and they project therefrom the casting 33 and extend parallel to the crank shaft 1 as shown in Figures 2 and 4. They receive the injector plungers 120, 121, 122 and 123 respectively accurately fitted to their barrel 124, adopted to reciprocate therein and each have offset end 125, head 126 with guide 127 and they are further provided with the groove 128 at their ends engaged in the barrels which are adapted to come into registration with the intake port 129 formed in the walls of each of the pump barrels 124 in order to permit the fuel oil to flow from the chamber 66, under pressure, into pump barrels 124 through the registration as shown in Figure 5 in the injector pump 116 and 118.

The injecting pumps 115 and 117 are connected to the fuel oil nozzles 104 and 106, respectively, see Figure 2, through the conduit 130 leading from the barrel 124 of the injecting pump 115 to the nozzle 104 connected thereto its barrel 114 through the opening 132 and the conduit 131 leading from the barrel 124 of the injecting pump 117 to the nozzle 106 and connected thereto its barrel 114 through opening 133.

The injecting pumps 116 and 118, are connected to the fuel oil nozzles 105 and 107 as shown in Figure 4 through the conduit 134 leading from the barrel 124 of the injecting pump 116 to the nozzle 105 connected thereto its barrel 114 through the openings 136 and the conduit 135 leading from the barrel 124 of the injecting pump 118 to the oil nozzle 107 and connected thereto its barrel 114 through the opening 137.

In order to vary the measuring capacity and to actuate the fuel injector plungers 120, 121, 122 and 123 the cam disc 138 is provided snugly fitted to the crank shaft 1 on its bearing 139 and disposed thereon in the fuel oil chamber 66, and adopted to have a degree of lateral motion thereon but locked thereto the shaft 1 against any rotary action by the shifting key 140 slidably engaged in the key seat 141, formed in the shaft and engaged in the key seat 142 formed in the hub 143 of the cam disc 138 and locked therein the key seat to the cam disc in a clamping position between the lug 144 and against the disc 138 by lug bolt 145, in order to facilitate means for connecting the cam disc 138 to the hand throttle 146.

The hand throttle 146 pivoted at 147 to the bracket 148, an integral part of the engine support 79, provided with the coupling pin 149 engaging the eye 150 of the shifting rod 151 freely fitted in the bore 152 formed in the end 89 of the crank shaft 1 extends therein and is threaded at 153 in the shifting key 140 in order to shift the cam disc 139 laterally back and forth on the shaft 1, through operation of the hand throttle 146 in order to control the speed of the engine.

At one side of the cam disc 138, see Figures 6, 7 and 8, the cam lobes 154 and 155 in circular paths 154' and 155' respectively engage the offset ends 125 of the injector plungers 120 and 122, while the cam lobes 156 and 157 in circular paths 156' and 157' engage the offset ends 125 of the injector plungers 121 and 123 and they lie on a diametrical line at right angle to that on which lies the lobes 154 and 155, in order to actuate the injector plungers 120 and 122, 121 and 123 in pairs simultaneously, once in energy revolution of the engine and on the half turns in regular timed order to inject the fuel oil into the firing chambers, to be mixed therein with the air, at a point a little in advance to where the highest magnitude of compression is reached and to inject the fuel oil into the firing chambers in pairs simultaneously and to those diametrically opposite each other.

In order to return the injector plungers 120, 121, 122 and 123, against the action of the cams, the spring 158 is coiled around the barrel of each of the injecting pumps 115, 116, 117 and 118, seated against the casting 33 and expanding against the head 126 of the injector plungers.

In order to assure proper alignment of the groove 128 and port 129 in the barrels 124 of the injecting pumps and to assure positive engagement of the off set ends 125 of the injector plungers 120, 121, 122 and 123 to the cam lobes, groove 159 is provided for and at the side of each one of the injecting pumps 115, 116, 117 and 118, in the casing 67, each receiving guide 127 of the injector plungers 120, 121, 122 and 123 to prevent the latter from revolving in the barrels 124.

In order to lubricate the engine the oil reservoir 160, formed in the discal side of and an integral part of the casting 32, of circular formation, is provided to carry the lubricant. The opening 161 in the oil reservoir 160, receives flange 162 of the drive shaft 163 secured to the reservoir 160 by a circular row of bolts 164 engaged in bolt opening 165 in the flange 162 and threaded in the openings 166 in the wall of the reservoir 160, as shown in Figure 2, facilitates excess to the oil scoop 167 suspended in the oil reservoir on its bearing 168 receiving the square shank end 169 of the crank shaft 1.

The scoop 167 extends radially from the crank shaft to a point near the inner periphery of the oil reservoir 160, its projecting end split and cut away at 170 in order that the end of the conduit 171 formed therein is exposed to scoop the oil belt formed in the reservoir through centrifugal force in order that the lubricant will flow through the conduit 171 the opening 172 in the square shank end 169 and into the bore 173 formed in the crank shaft provided with plug inserts 173' threaded therein at 174, 175 and 176 in order to conduct the oil through the conduit 177 to lubricate the connecting rod bearing 4 and to flow through the conduit 178 and back into the bore 173 at the opposite side of the crank pin 3 from which the oil enters the shaft and through the opening 179 to lubricate the bearing at this point. The reservoir refiller plugs 180 are provided diametrically opposite each other in the openings 181 communicating with central bore 182 in the drive shaft 163.

The fins 183 formed in the castings 32 and 33 around piston chamber 40 and extending therefrom in radial planes in order that the action of centrifugal force causes the air to circulate therethrough between the fins 183 in order to cool the engine.

Assuming that the fuel oil is being supplied to the fuel pump 80 through the inlet pipe 81, and that the fuel pump 80, the outlet pipe 82, conduit 83, the fuel oil chamber 66, the injecting pumps 115, 116, 117 and 118, the nozzles 104, 105, 106 and 107 and the conduits associated therewith are all primed with the fuel oil and free of air or any gasses and that the engine is in a position corresponding to that as shown in Figure 1. The injecting pumps 116 and 118 are in a position where their intake ports 124 and the grooves 128 in the plungers 121 and 123 are in registration as shown in Figure 5 and the off set stems 125 of the plungers 121 and 123 follow the circular paths 157' and 156' are one half turn from the cam lobe 157 and 156 and the stem 125 of plungers 120 and 122 are engaged to the lobe 154 and 155 as shown in Figure 6.

Assuming that the air has entered the firing chamber 43 and 45 through the air entrance 93, the intake air casing 92, intake manifold 95, opening 98, crank case 64 and through the intake ports 47, 48, 49 and 50; and that an impulse is given to the casing 31 to revolve in the direction indicated by the arrow. The engagement of the wrist pin 6 to the rollers 39 and 39' in the radial cross head guide grooves 38 and 38' causes the connecting rod 5 to revolve on the crank pin 3 and carrying the piston carrying arms 12 and 19 and consequently the pistons carried thereby the arms through connections of the toggle joint links 8 and 9. The revolving of the connecting rod 5 on the crank pin 3 exerts to pull at the knee formed by the links 8 and 9 in towards the axis of the engine tending to spread their ends connected to the piston carrying arms 12 and 19 in opposite direction as they are being carried in a circle. The one end spreading in the direction of rotation, that of the link 8, is connected to and imposes a positive acceleration to the speed of the piston carrying arm 12 and consequently the pistons 17 and 18, and the other end part of link 9 spreading in the opposite direction to that of rotation is connected to and imposes a negative acceleration to the speed of the piston carrying arm 19 and consequently the pistons 24 and 25 relative to the speed of the casing 31. The difference of acceleration causes the spaces between the pistons constituting the firing chambers 42 and 44 to be expanded and the spaces or firing chambers 43 and 45 to be contracted and compress the air therein the chambers through the first half turn of the circle.

As the casing 31 revolves to a point a little in advance to where it reaches the half turn of the circle, or a little in advance to a position corresponding to that as shown in Fig. 3, the injector plungers 121 and 123 are actuated simultaneously by the cam lobes 156 and 157 through engagement of their stems 125 to the lobes as shown in Fig. 4. The plungers 121 and 123 are forced to move inwardly toward the casting 33, carrying the grooves 128 out of registration with the intake ports 129 and trapping the fuel oil there in the barrels 124 in the front of the plungers 121 and 123. The fuel oil in front of the plunger 121 is forced to flow in the conduit 134, opening 136, the barrel 114 of the nozzle 105 forcing the check valve 111 from its seat 112 against the resistance of the spring 113 through the jet 110 and injected into the firing chamber 43, and the fuel oil trapped ahead of the plunger 123 is forced to flow in the conduit 135, opening 137 in the barrel 114 of the nozzle 107 forcing the valve 111 from its seat 112 against the resistance of the spring 113 through the jet 110 and injected into the firing chamber 45. The fuel is injected into the firing chambers 43 and 45 simultaneously and mixed therein with the highly compressed air is ignited instantly by the rotational temperature of the air.

At the same time that the fuel is injected in the chambers 43 and 45 or a little before the engine reaches the half turn of the circle, or in a position a little in advance to that as shown in Figure 3, the intake ports 47, 48, 49 and 50 and the exhaust ports 62 and 64 are uncovered by the pistons 17, 24 and 18 and 25 and brought into registration with the firing chambers 42 and 44, the air in the crank case chamber 46 influenced by centrifugal action is swept into the firing chambers 42 and 44 sweeping out the medium ahead of it through the exhaust ports 62 and 64 through the muffler vacuum chamber 57 and forced out at the outlet openings 59 by the impellers 60.

As the casing 31 revolves to a point a little past the half circle or past the dead center line we may assume that the engine is then revolving on its own power through the energy expanding in the firing chambers 43 and 45, between the pistons 17 and 25, 18 and 24, and compressing the air in the chambers 42 and 44, causing the piston carrying arms 12 and 19 to apply opposite force to the ends of the toggle joint links 8 and 9 connected there to the arms causing them to retract forcing their knee end parts away from the axis of the engine and exerting a pulling force on the stationary crank pin 3, through connection of the rod 5, the wrist pin 6 carrying the rollers 39 and 39' engaged in the radial grooves 38 and 38' where the energy is transmitted to revolve the casing 31.

As the energy continues to expand in the firing chambers 43 and 45 it compresses the air in the chambers 42 and 44 and as the casing reaches a point a little in advance to the second half turn of the circle or in a position a little in advance to that as shown in Fig. 1, the injector plungers 120 and 122 are actuated by the cam lobes 154 and 155 through engagement of their offset stems 125 to the lobes as shown in Fig. 2. The plungers 120 and 122 are forced to move inwardly towards the casting 33, carrying the grooves 128 out of registration with the intake ports 129 in the wall of the barrels 124, and trapping the fuel oil in the barrels 124 in the front of the plungers 120 and 122 and forcing the oil to flow in the conduits 130 and 131 to the nozzles 104 and 106. The oil flowing into the conduit 130 through the opening 132 in the wall of the nozzle 104 and flowing in its barrel 114 against the valve 111 forcing it from its seat 112 against the resistance of the spring 113 through the jet 110 is injected into the firing chamber 42 and the oil flowing into the conduit 131 through the opening 133 in the walls thereof and into the barrel 114 of the nozzle 106 against the valve 111 forcing it from its seat 112 against the resistance of the spring 113 through the jet 110 is injected into the firing chamber 44. The fuel injected into the firing chambers 42 and 44 simultaneously and mixed therein with the highly compressed air is ignited instantly by the rational temperature of the air and continues to revolve the casing 31 as the explosions occur one after another at every half turn of the circle.

At approximately the same time that the fuel is injected into the chambers 42 and 44 the pistons 17 and 25, 18 and 24, uncovers the intake ports 47, 48, 49 and 50 and the exhaust ports 63 and 65. The air drawn in from and through the air entrance 93, the air chamber 92, intake manifold 95, openings 98 and into the crank case 46 subjected therein to centrifugal force is swept through the intake ports 47, 48, 49 and 50 into the firing chambers 43 and 45 sweeping the exhaust gases ahead of it through the exhaust ports 63 and 65 through the muffler vacuum chamber 57 and the outlet ports 59.

It is apparent in the foregoing description that the firing of the engine occurs at 180 degrees apart or twice in every revolution of the engine, and that each firing impulse constitutes the explosion of two of the firing chambers which occur simultaneously.

I claim:

1. In a rotary internal combustion engine, the combination of engine transmission comprising a base, a crankshaft fixed to said base, a casing rotatably engaging said crankshaft on opposite sides of the offset portion thereof, an annular chamber in said casing, said casing having openings communicating said chamber with the interior of said casing, opposed pairs of arcuate pistons slidable in said chamber, a pair of diametrically disposed piston carrying members disposed one on each side of the offset portion of said crankshaft, a sleeve carried by the central portion of each member rotatably engaging said shaft, an inwardly offset L-shaped part integral with the ends of said members and fixed to said pistons through said openings, a connecting rod rotatably engaging at one end on said crankshaft, and a pair of toggle links rotatably connected at one end to the opposite end of said connecting rod and at the opposite end rotatably connected to a member inwardly of said L-shaped part.

2. In a rotary internal combustion engine, the combination of engine transmission comprising a base, a crankshaft fixed to said base, a casing rotatably engaging said crankshaft on opposite sides of the offset portion thereof, an annular chamber in said casing, said casing having openings communicating said chamber with the interior of said casing, opposed pairs of arcuate pistons slidable in said chamber, a pair of diametrically disposed piston carrying members disposed one on each side of the offset portion of said crankshaft, an inwardly offset L-shaped part integral with the ends of said members and fixed to said pistons through said openings, a connecting rod rotatably engaging at one end on said crankshaft, a pair of toggle links rotatably connected at one end to the opposite end of said connecting rod and at the opposite end rotatably connected to a member inwardly of said L-shaped part, said chamber having spaced intake and exhaust ports, an annular muffler U-shaped in transverse section engaging about said casing and said exhaust ports, and means carried by said muffler adjacent said exhaust ports to form a partial vacuum upon rotation of said casing to thereby assist in the withdrawal of the exhaust gases.

3. In a rotary internal combustion engine, the combination of engine transmission comprising a base, a crankshaft fixed to said base, a casing rotatably engaging said crankshaft on opposite sides of the offset portion thereof, an annular chamber in said casing, said casing having openings communicating with said chamber and the interior of said casing, said casing also having a pair of radial crosshead guide openings, opposed pairs of arcuate pistons slidable in said chamber, a pair of diametrically disposed piston carrying members disposed one on each side of the offset portion of said crankshaft, a sleeve carried by the central portion of each member rotatably engaging said shaft, an inwardly offset L-shaped part integral with the ends of said members and fixed to said pistons through said openings, a connecting rod rotatably engaging at one end on said crankshaft, a pair of toggle links rotatably connected at one end thereof to said piston carrying members, and a crosshead rotatably engaging through said connecting rod and the opposite ends of said toggle links, said crosshead engaging at the opposite ends thereof in said radial openings to thereby impart rotary movement to said casing upon rotation of said connecting rod on said crankshaft.

ERNEST J. SERPAS.